United States Patent
Suzuki

(10) Patent No.: US 12,141,487 B2
(45) Date of Patent: Nov. 12, 2024

(54) NON-TRANSITORY COMPUTER-READABLE RECORDING MEDIUM STORING COMPUTER-READABLE INSTRUCTIONS FOR TERMINAL DEVICE

(71) Applicant: BROTHER KOGYO KABUSHIKI KAISHA, Nagoya (JP)

(72) Inventor: Satoshi Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/806,582

(22) Filed: Jun. 13, 2022

(65) Prior Publication Data
US 2022/0398051 A1 Dec. 15, 2022

(30) Foreign Application Priority Data
Jun. 14, 2021 (JP) ................................. 2021-098957

(51) Int. Cl.
  G06F 3/12 (2006.01)
  H04L 9/40 (2022.01)
  H04L 45/00 (2022.01)

(52) U.S. Cl.
  CPC .......... *G06F 3/1236* (2013.01); *G06F 3/1203* (2013.01); *G06F 3/1231* (2013.01); *H04L 45/22* (2013.01); *H04L 63/0272* (2013.01)

(58) Field of Classification Search
  CPC .... G06F 3/1236; G06F 3/1203; G06F 3/1231; H04L 63/0272; H04L 45/22
  See application file for complete search history.

(56) References Cited

U.S. PATENT DOCUMENTS

| 7,020,084 | B1 |   | 3/2006 | Tanaka et al. |
| 11,347,449 | B1 | * | 5/2022 | Badana ................. G06F 3/1222 |
| 11,474,767 | B1 | * | 10/2022 | Sait ....................... G06F 3/1268 |
| 2007/0091329 | A1 | * | 4/2007 | Zhang ................. H04L 63/0236 |
|  |  |  |  | 358/1.1 |

(Continued)

FOREIGN PATENT DOCUMENTS

JP 2020-154802 A 9/2020

OTHER PUBLICATIONS

Extended European Search Report dated Nov. 8, 2022 from related EP 22 178 438.2.

*Primary Examiner* — Blake J Rubin
(74) *Attorney, Agent, or Firm* — Scully, Scott, Murphy & Presser, PC

(57) ABSTRACT

A terminal device may, in a case where a function executing operation is accepted, send, by using a target communication path, a function executing instruction for causing the function executing device. The terminal device may, in a case where a predetermined condition which includes a memory of the terminal device storing Virtual Private Network (VPN) communication information is satisfied, execute a related process related to switching the target communication path from a first communication path to a second communication path. The first communication path may be a communication path for communicating with the function executing device via a local area network without using the Internet. The second communication path may be a communication path for communicating with the function executing device via the Internet.

22 Claims, 9 Drawing Sheets

(56) References Cited

U.S. PATENT DOCUMENTS

| | | | | |
|---|---|---|---|---|
| 2007/0199065 A1* | 8/2007 | Ogawa | ............... | H04L 63/0272 |
| | | | | 713/153 |
| 2007/0236725 A1* | 10/2007 | Harmon | ............... | G06F 3/1262 |
| | | | | 358/1.15 |
| 2009/0286531 A1* | 11/2009 | Bhatt | .................... | H04W 48/18 |
| | | | | 455/426.1 |
| 2011/0154477 A1* | 6/2011 | Parla | .................. | H04L 63/0272 |
| | | | | 726/15 |
| 2012/0030124 A1* | 2/2012 | Cronkright, II | ....... | G06Q 40/02 |
| | | | | 705/316 |
| 2012/0140285 A1* | 6/2012 | Kamath | ............... | G06F 3/1204 |
| | | | | 358/1.15 |
| 2012/0218594 A1* | 8/2012 | Komine | ............... | G06F 3/1241 |
| | | | | 358/1.15 |
| 2013/0229680 A1* | 9/2013 | Kitada | ................. | G06F 3/1273 |
| | | | | 358/1.15 |
| 2015/0301766 A1* | 10/2015 | Poirier | ................. | G06F 3/1236 |
| | | | | 358/1.15 |
| 2016/0323478 A1* | 11/2016 | Tsutsumi | ........... | H04N 1/00307 |
| 2017/0039007 A1* | 2/2017 | Nathani | ............... | G06F 21/608 |
| 2017/0222978 A1* | 8/2017 | Cathrow | ............. | H04L 63/0236 |
| 2019/0319873 A1 | 10/2019 | Shelar et al. | | |
| 2021/0273913 A1* | 9/2021 | Bosch | ................. | H04L 12/4641 |
| 2022/0116381 A1* | 4/2022 | Bosch | ................ | H04L 63/0815 |
| 2022/0294913 A1* | 9/2022 | Otani | ................. | H04N 1/00145 |
| 2022/0300221 A1* | 9/2022 | Oshima | ................. | G06F 3/1288 |
| 2022/0300225 A1* | 9/2022 | Oshima | ................. | G06F 3/1286 |
| 2022/0311905 A1* | 9/2022 | Nakamura | .......... | H04L 63/0272 |

\* cited by examiner

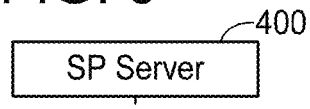
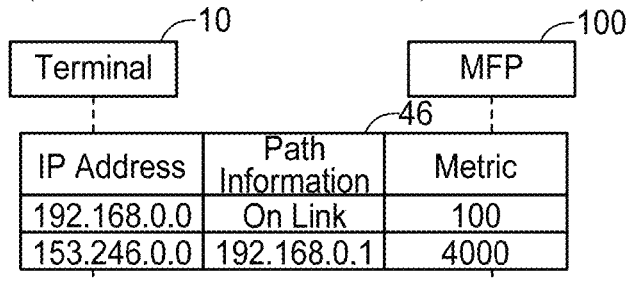
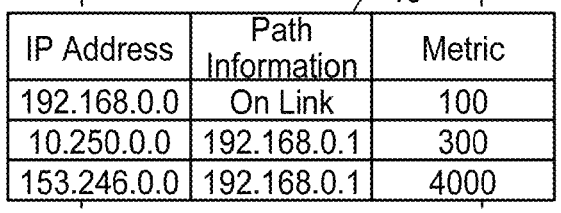
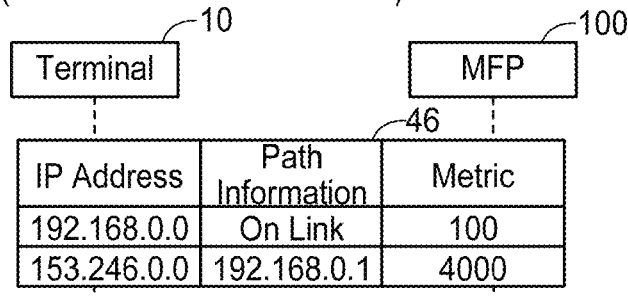
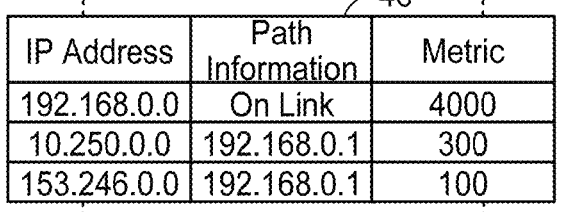

NON-TRANSITORY COMPUTER-READABLE RECORDING MEDIUM STORING COMPUTER-READABLE INSTRUCTIONS FOR TERMINAL DEVICE

CROSS-REFERENCE TO RELATED APPLICATION

This application claims priority to Japanese Patent Application No. 2021-098957, filed on Jun. 14, 2021, the entire contents of which are incorporated herein by reference.

BACKGROUND

A print system provided with a client device connected to a local network and an image processing device not connected to this local network is known. The image processing device executes printing corresponding to a print job received from the client device by connecting, using a Virtual Private Network (VPN) connection, to the local network, to which the client device belongs.

SUMMARY

In the above technique, no consideration is given to a situation in which a plurality of communication paths exists between the image processing device and the client device. The description herein provides an art configured to cause a function executing device to execute a specific function by using a communication path suitable for a communication environment of a terminal device.

A non-transitory computer-readable recording medium storing computer-readable instructions for a terminal device is disclosed herein. The computer-readable instructions, when executed by a processor of the terminal device, may cause the terminal device to, in a case where a function executing operation for causing a function executing device to execute a specific function is accepted, send, by using a target communication path, a function executing instruction for causing the function executing device to execute the specific function to the function executing device. The computer-readable instructions, when executed by the processor, may cause the terminal device to, in a case where a predetermined condition which includes a memory of the terminal device storing Virtual Private Network (VPN) communication information for using a VPN is satisfied, execute a related process which is related to switching the target communication path from a first communication path to a second communication path. The first communication path may be a communication path for communicating with the function executing device via a local area network without using the Internet. The second communication path may be a communication path for communicating with the function executing device via the Internet.

According to the above configuration, the terminal device executes the related process related to switching the target communication path from the first communication path to the second communication path in the case where the predetermined condition, which includes storing the VPN communication information, is satisfied. As a result, the target communication path can be switched to the second communication path. Due to this, in a communication environment in which there is a possibility that the VPN may be used, the terminal device can cause the function executing device to execute a specific function by using the second communication path via the Internet.

Also, another non-transitory computer-readable recording medium storing computer-readable instructions for a terminal device is disclosed herein. The terminal device may include a memory configured to store one or more network adapters. The computer-readable instructions, when executed by a processor of the terminal device, may cause the terminal device to, in a case where a function executing operation for causing a function executing device to execute a specific function is accepted, send, by using a target communication path, a function executing instruction for causing the function executing device to execute the specific function to the function executing device. The computer-readable instructions, when executed by the processor, may cause the terminal device to, in a case where a predetermined condition which includes the one or more network adapters in the memory including a specific adapter indicating a communication via the Internet is satisfied, execute a related process related to switching the target communication path from a first communication path to a second communication path. The first communication path may be a communication path for communicating with the function executing device via a local area network without using the Internet. The second communication path may be a communication path for communicating with the function executing device via the Internet.

According to the above configuration, the terminal device executes the related process related to switching the target communication path from the first communication path to the second communication path in the case where the predetermined condition, which includes the one or more network adapters in the memory including the specific adapter indicating communication via the Internet, is satisfied. As a result, the target communication path can be switched from the first communication path to the second communication path. As above, in a communication environment in which there is a possibility that communication via the Internet may be executed, the terminal device can cause the function executing device to execute a specific function by using the second communication path via the Internet.

Also, another non-transitory computer-readable recording medium storing computer-readable instructions for a terminal device is disclosed herein. The terminal device may include a memory configured to store a routing table The computer-readable instructions, when executed by a processor of the terminal device, may cause the terminal device to, in a case where a function executing operation for causing a function executing device to execute a specific function is accepted, send, by using a target communication path, a function executing instruction for causing the function executing device to execute the specific function to the function executing device. The computer-readable instructions, when executed by the processor, may cause the terminal device to, in a case where a predetermined condition which includes a global IP address being added to the routing table in the memory is satisfied, execute a related process related to switching the target communication path from a first communication path to a second communication path, the routing table being a table for storing information which is used by an Operating System (OS) program when the OS program determines a communication path for executing communication with another device. The first communication path may be a communication path for communicating with the function executing device via a local area network without using the Internet. The second communication path may be a communication path for communicating with the function executing device via the Internet.

According to the above configuration, the terminal device executes the related process related to switching the target communication path from the first communication path to the second communication path in the case where the predetermined condition, which includes the global IP address being added to the routing table, is satisfied. As a result, the target communication path can be switched from the first communication path to the second communication path. As above, in a communication environment in which there is a possibility that communication using the global IP address may be executed, the terminal device can cause the function executing device to execute a specific function by using the second communication path via the Internet.

A computer-readable recording medium storing the computer-readable instructions is also novel and useful. Further, a terminal device and a method executed by the terminal device are also novel and useful. Further, a communication system comprising the terminal device and other device(s) (e.g., a function executing device) is also novel and useful.

BRIEF DESCRIPTION OF THE DRAWINGS

FIG. 9 shows a sequence diagram of Case D-1 and Case D-2 of a third embodiment.

DETAILED DESCRIPTION

First Embodiment

Figure 1:
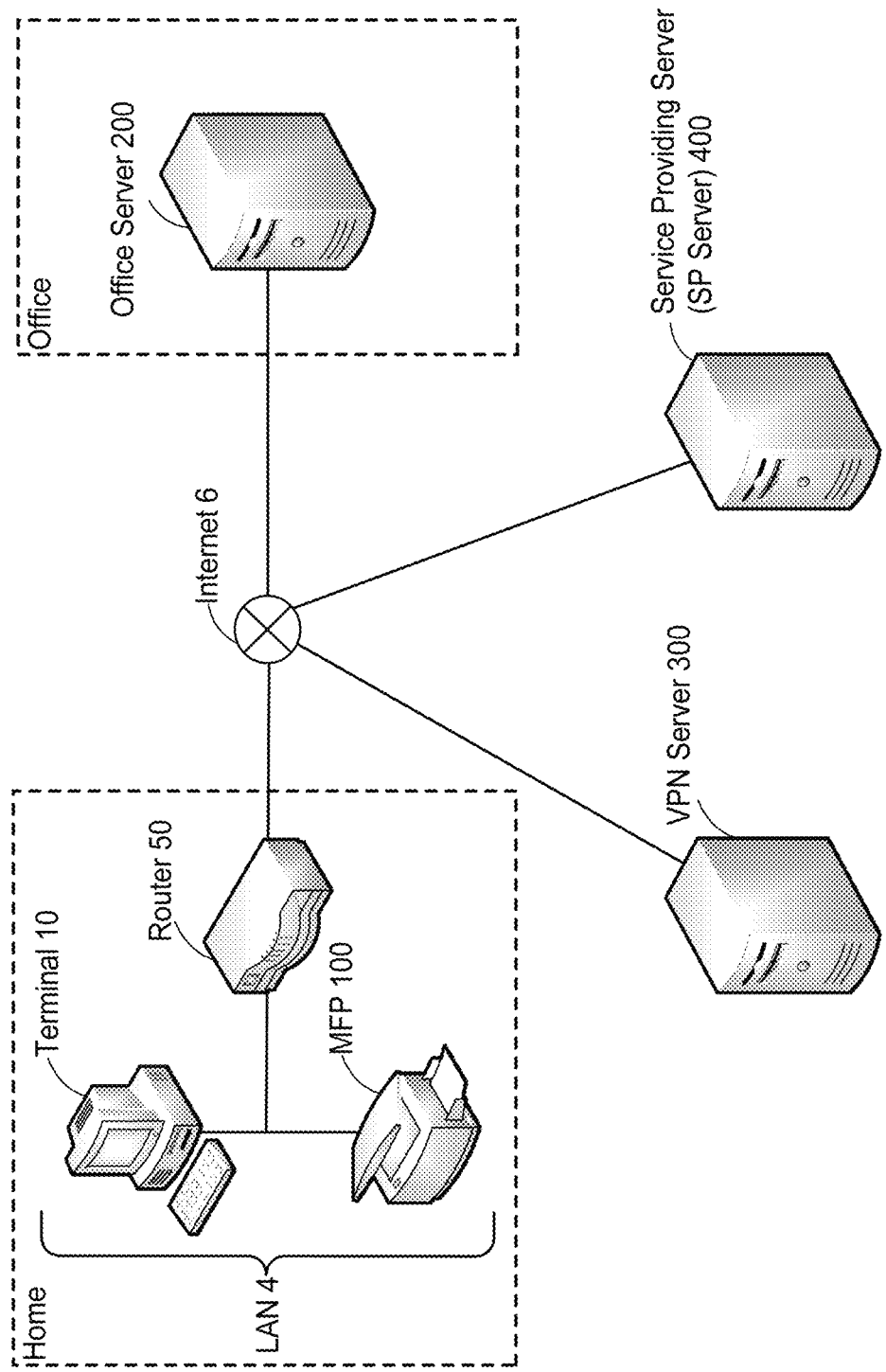
FIG. 1 shows a configuration of a communication system.

Configuration of Communication System; FIG. 1

As shown in FIG. 1, a communication system 2 includes a terminal 10, a router 50, a Multi-Function Peripheral (MFP) 100, an office server 200, a Virtual Private Network (VPN) server 300, and a service providing server 400. Hereinbelow, the service providing server 400 will be termed "SP server 400". In the description herein, a situation is assumed in which a user of the terminal 10 is working remotely from home and accesses the office server 200, which is installed in an office, by using a VPN.

The terminal 10, the router 50, and the MFP 100 are installed in the user's home. The terminal 10, the router 50, and the MFP 100 are connected to a Local Area Network (LAN) 4. In the present embodiment, the LAN 4 is a wired LAN. In a variant, the LAN 4 may be a wireless LAN. The LAN 4 is connected to the Internet 6. As such, the terminal 10, the router 50, and the MFP 100 are connected to the Internet 6 via the LAN 4.

The terminal 10 is a portable terminal device such as a cell phone (e.g., a smartphone), a PDA, and a tablet PC. In a variant, the terminal 10 may be a stationary terminal device.

The router 50 is a device configured to relay communication between the LAN 4 and the Internet 6. The MFP 100 is a peripheral device (e.g., a peripheral device of the terminal 10) configured to execute multiple functions such as a print function, a scan function, and a FAX function.

The office server 200 is connected to an intranet (not shown) in the office. The intranet is connected to the Internet 6.

The VPN server 300 and the SP server 400 are established on the Internet 6. The VPN server 300 is for example a server used by the terminal 10 to establish a VPN connection. The SP server 400 is for example a server for providing a service related to the MFP 100 (e.g., remote print service, remote scan service).

Normally, the office intranet cannot be accessed from outside, thus in the situation where the user of the terminal 10 is working from home, he/she cannot access the office server 200 using the terminal 10. As such, the terminal 10 establishes a VPN connection with the office intranet by using the VPN server 300. As a result, the terminal 10 enters a state of belonging to the office intranet. Due to this, even in the situation where the terminal 10 is located in the user's home, the terminal 10 can access the office server 200 using the VPN.

In a situation where the VPN is not used, the terminal 10 can cause the MFP 100 to execute print by sending a print instruction to the MFP 100 using the LAN 4. Specifically, when the terminal 10 accepts a print operation from the user instructing the MFP 100 to print, it sends the print instruction including a local IP address of the MFP 100 as a destination. As a result, the MFP 100 can execute print according to this print instruction.

Here, a situation will be considered in which the terminal 10 sends the print instruction to the MFP 100 using the LAN 4 while the terminal 10 is in the state of using the VPN. In such a situation, there is a possibility that the terminal 10 cannot execute communication with a device within the LAN 4 by using the LAN 4. Specifically, when the terminal 10 uses the VPN, a local IP address "192.168.0.0" of the MFP 100 may possibly be deleted from a routing table 46 that will be described later. In this case, when the terminal 10 accepts the print operation for instructing the MFP 100 to print, it sends the print instruction to a default gateway (such as the router 50). Since there is a possibility that the default gateway does not transfer the print instruction to the MFP 100, the print instruction might not be sent to the MFP 100. As above, in the situation where the terminal 10 is using the VPN, there is a possibility that it cannot cause the MFP 100 to execute print using the LAN 4. The present embodiment provides an art that enables to suitably cause the MFP 100 to execute its function even in the situation where the terminal 10 is using the VPN.

Figure 2:
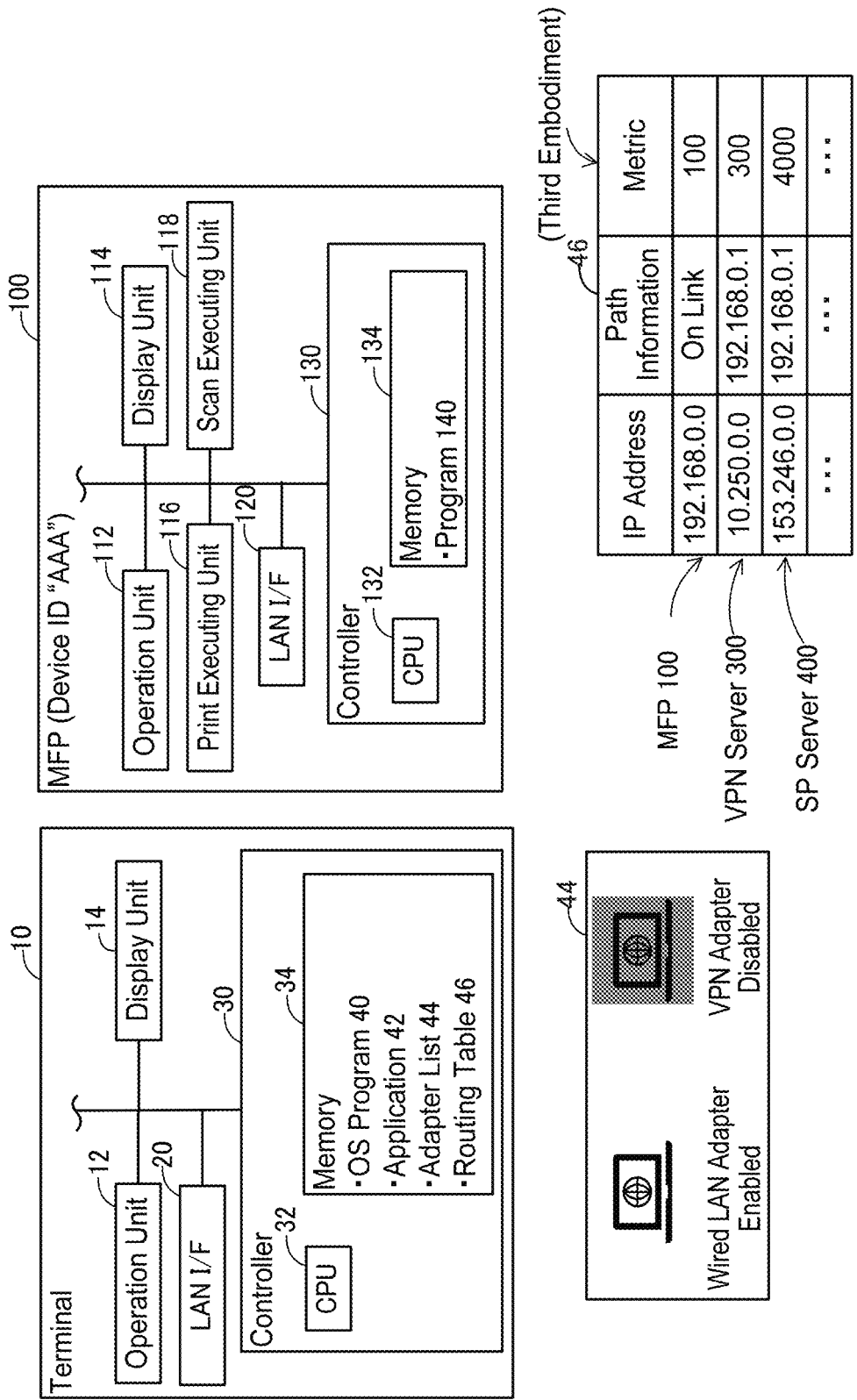
FIG. 2 shows a hardware configuration of the communication system.

Configuration of Terminal 10; FIG. 2

The terminal 10 includes an operation unit 12, a display unit 14, a LAN interface 20, and a controller 30. The respective units 12 to 30 are connected to a bus line (reference sign omitted). Hereinbelow, an interface will be termed "I/F". The operation unit 12 may be a mouse and a keyboard. The user can input various instructions to the terminal 10 by operating the operation unit 12. The display unit 14 is a display configured to display various types of information. A LAN cable is connected to the LAN I/F 20.

The controller 30 includes a CPU 32 and a memory 34. The CPU 32 is configured to execute various processes according to an Operating System (OS) program 40 and an application 42 that are stored in the memory 34. Hereinbelow, the OS program 40 and the application 42 will respectively be termed "OS 40" and "app 42". The OS 40 is a program for controlling basic operations of the terminal 10. The app 42 is a program for causing a MFP (such as 100) to execute functions such as print and scan. The memory 34 is composed of a volatile memory and/or a nonvolatile memory, for example.

The memory 34 further stores an adapter list 44 and the routing table 46. The adapter list 44 is a list of network adapters indicating communication environments which are available to the terminal 10. In other words, the terminal 10 stores information for executing communication corresponding to each network adapter included in the adapter list 44. Each network adapter stored in the adapter list 44 indicates either "enabled" or "disabled", where "enabled" indicates that the communication environment corresponding to the network adapter is in use, and "disabled" indicates that the communication environment corresponding to the network adapter is not in use.

For example, in the example of FIG. 2, the memory 34 stores a wired LAN adapter and a VPN adapter. The wired LAN adapter indicates "enabled", and the VPN adapter indicates "disabled". The VPN adapter indicating "disabled" is shown in a gray background. That is, in the example of FIG. 2, the terminal 10 stores both information for executing communication using the wired LAN 4 and information for executing communication using the VPN, and is using the wired LAN 4 but not the VPN. When the terminal 10 shifts to a state of using the VPN, the VPN adapter is changed to "enabled" while maintaining the state of the wired LAN adapter "enabled".

The routing table 46 stores information that is used by the OS 40 when it determines a communication path for executing communication with another device. Specifically, the routing table 46 stores an IP address and path information in association with each other. Each IP address in the routing table 46 indicates an IP address of a device with which the terminal 10 can communicate. Each path information indicates a communication path for executing communication with the IP address associated with this path information as a destination. In the present embodiment, each path information indicates a destination of a relay device with which the terminal 10 is to communicate first (i.e., a so-called next hop) among one or more relay devices (such as routers) that are present on the communication path for executing communication with the IP address associated with this path information as the destination.

For example, in an example of FIG. 2, an IP address "192.168.0.0" is the local IP address of the MFP 100. Since the MFP 100 is a device within the same LAN 4 as the terminal 10, the path information indicates "on link", meaning that the terminal 10 can communicate directly with the MFP 100 (i.e., can communicate without using the Internet 6). An IP address "10.250.0.0" is a global IP address of the VPN server 300 that is outside the LAN 4. Further, an IP address "153.246.0.0" is a global IP address of the SP server 400 that is outside the LAN 4. Since both the VPN server 300 and the SP server 400 are devices outside the LAN 4, the path information for each of them indicates an IP address "192.168.0.1" of the router 50, which is the next hop.

Configuration of MFP 100

The MFP 100 includes an operation unit 112, a display unit 114, a print executing unit 116, a scan executing unit 118, a LAN I/F 120, and a controller 130. The respective units 112 to 130 are connected to a bus line (reference sign omitted). The operation unit 112 includes a plurality of keys. The user can input various instructions to the MFP 100 by operating the operation unit 112. The display unit 114 is a display configured to display various types of information. The print executing unit 116 includes an inkjet or laser print mechanism. The scan executing unit 118 includes a CCD or CIS scan mechanism, for example. A LAN cable is connected to the LAN I/F 120.

The controller 130 includes a CPU 132 and a memory 134. The CPU 132 is configured to execute various processes according to a program 140 stored in the memory 134. The memory 134 is composed of a volatile memory and/or a nonvolatile memory, for example.

Figure 3:
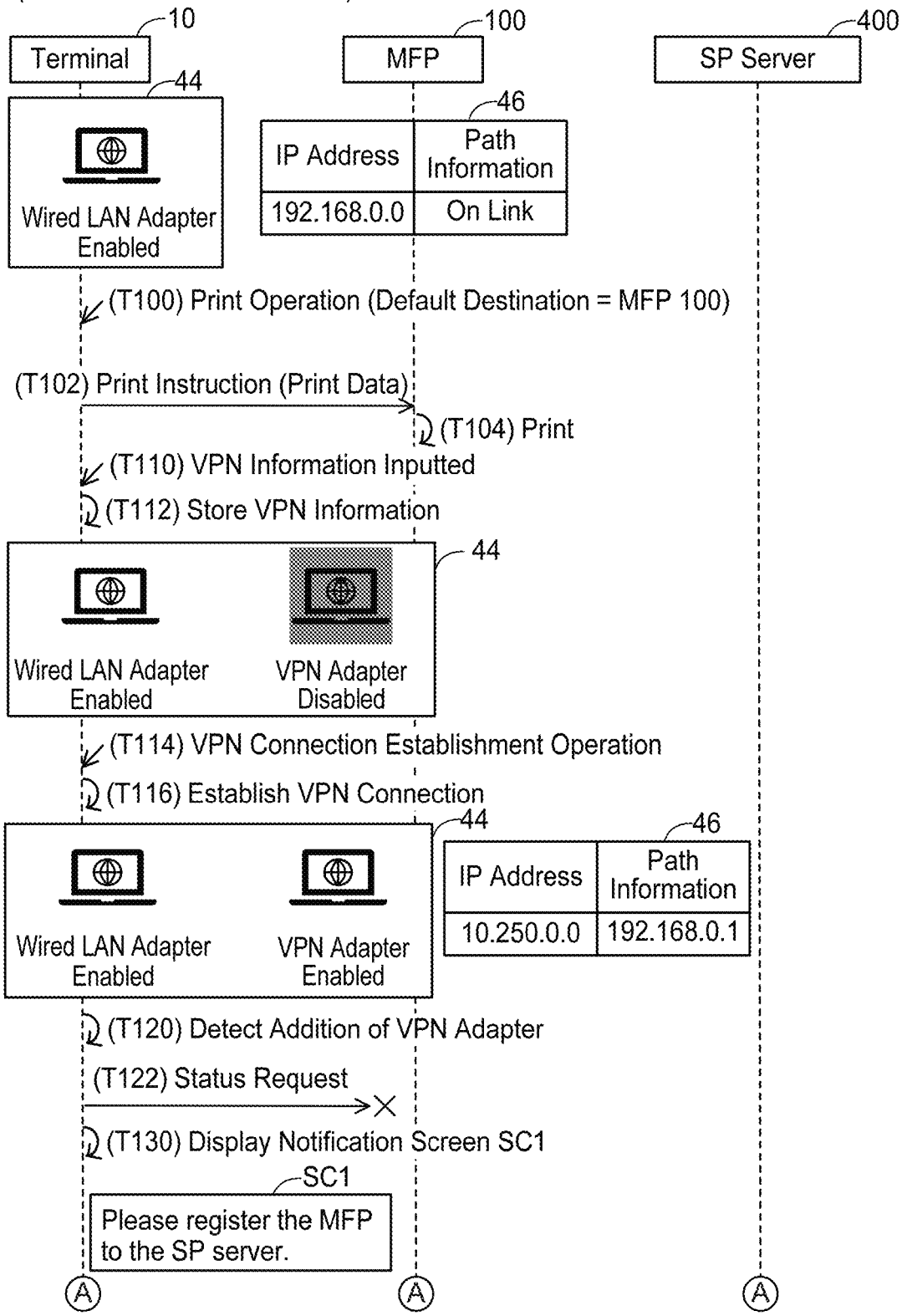
FIG. 3 shows a sequence diagram of Case A of a first embodiment.
Figure 4:
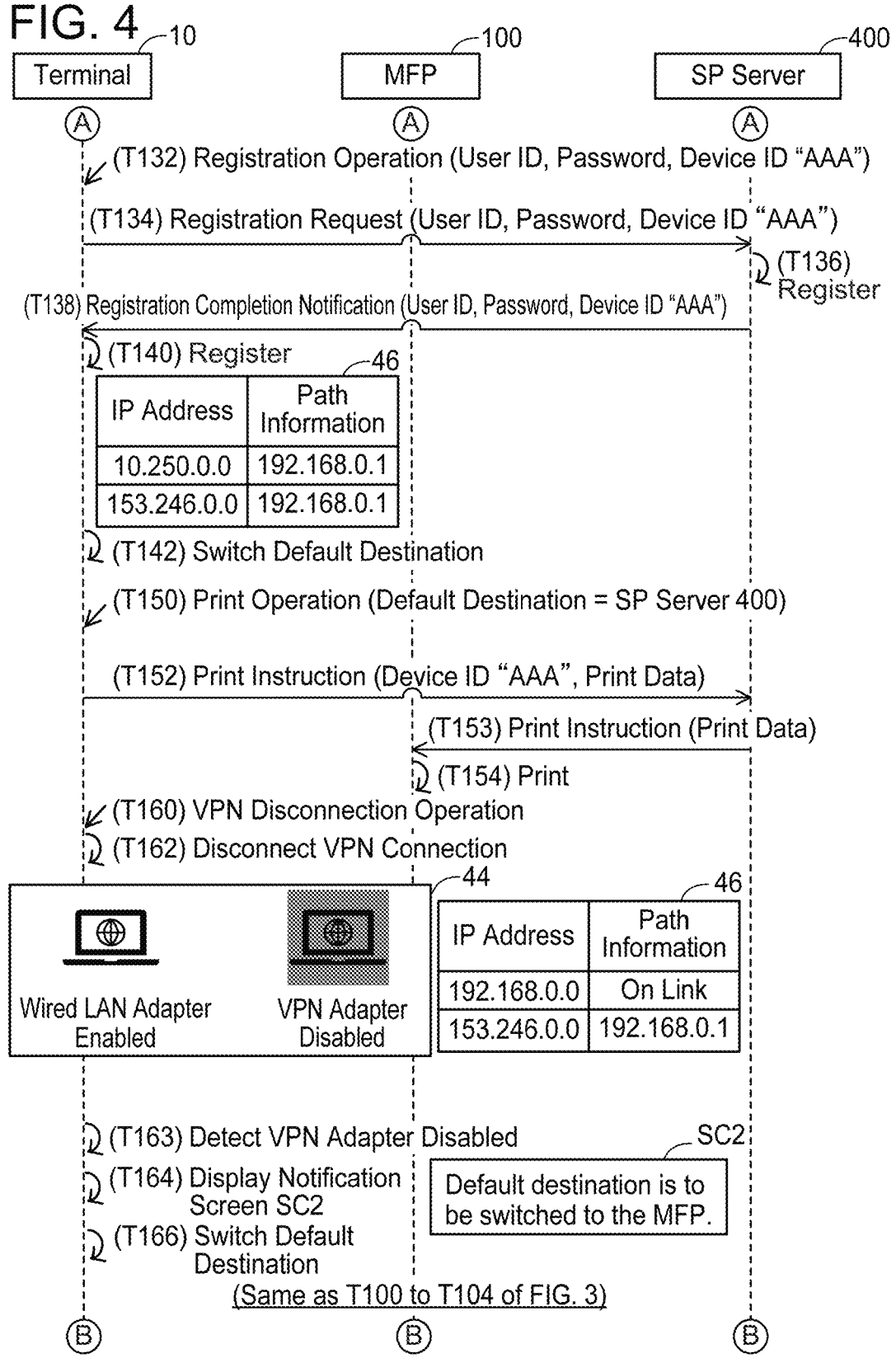
FIG. 4 shows a sequence diagram continued from FIG. 3.
Figure 5:
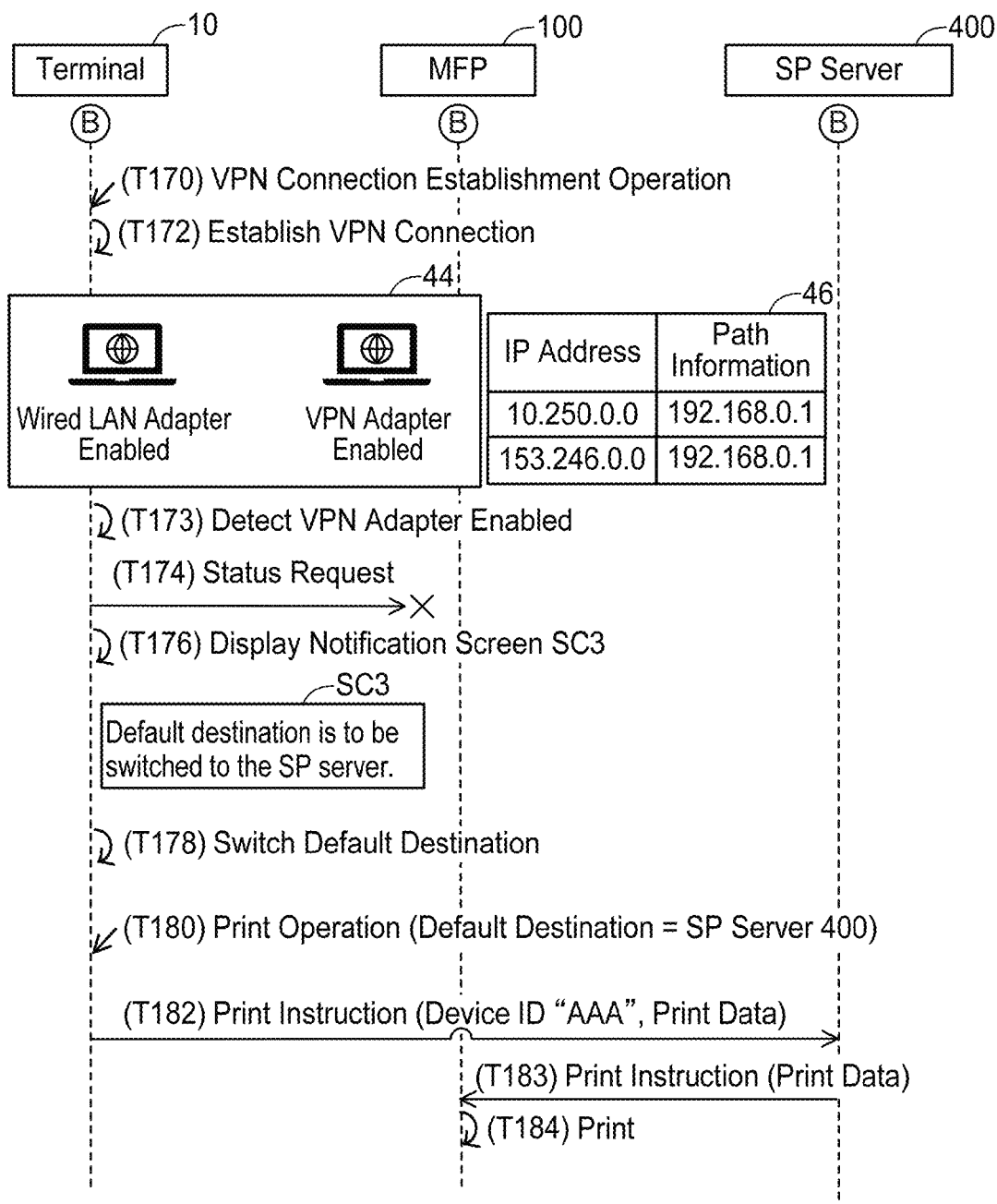
FIG. 5 shows a sequence diagram continued from FIG. 4.

Case A; FIGS. 3 to 5

Next, Case A will be described with reference to FIGS. 3 to 5. In an initial state of FIG. 3, communication can be executed between the terminal 10 and the MFP 100 via the wired LAN 4. Further, the VPN communication information related to the VPN is not yet stored. That is, in the initial state of FIG. 3, the adapter list 44 includes only the wired LAN adapter indicating "enabled". Further, the routing table 46 stores the IP address "192.168.0.0" of the MFP 100 in association with the path information "on link".

Hereinbelow, for the purpose of facilitating understanding, processes executed by the CPUs (such as 32 and 132) of the respective devices (such as the terminal 10 and the MFP 100) will be described with the respective devices (such as the terminal 10 and the MFP 100) as subjects of action rather than the CPUs as the subjects of action. Especially in regard to the terminal 10, processes executed by the OS 40 without using the app 42 may be described with the OS 40 as the subject of action, and processes executed by the app 42 may be described with the app 42 as the subject of action. Further, each communication executed by the terminal 10 or the MFP 100 is executed via the LAN I/F 20 (or 120). As such, hereinbelow, the description "via the LAN I/F 20 (or 120)" may be omitted upon explaining communication-related processes.

In T100 of FIG. 3, the app 42 of the terminal 10 accepts a print operation from the user. At this stage in T100, a default destination (i.e., a default print port) of the print instruction is set to be the MFP 100. Here, the "default destination" means a destination that is used when the destination is not changed by the user. In T100, the user does not change the destination of the print instruction. Due to this, in T102, the app 42 references the routing table 46 and sends the print instruction including the local IP address "192.168.0.0" of the MFP 100 as the destination. Especially, since the path information "on link" is associated with the IP address "192.168.0.0", the app 42 directly sends the print instruction to the MFP 100 (i.e., without using the router 50 nor the Internet 6). The print instruction includes print data representing a print target image.

When the print instruction is received from the terminal 10 in T102, the MFP 100 executes print of the image according to the print data included in this print instruction in T104. Although not shown, when the MFP 100 completes printing, the MFP 100 notifies the terminal 10 about the completion.

When the OS 40 of the terminal 10 accepts an input of VPN information from the user in T110, it stores the VPN information in T112. The VPN information is information for the terminal 10 to use the VPN (such as a user ID and a password). As a result, the VPN adapter is added to the adapter list 44. At this stage, since the OS 40 has not yet accepted an operation for establishing the VPN connection (i.e., is not using the VPN at this point), the VPN adapter indicates "disabled".

When the operation by the user for establishing the VPN connection is accepted in T114, the OS 40 uses the stored VPN information and establishes the VPN connection with the VPN server 300 in T116. As a result, the terminal 10 can now execute communication with the office server 200 via the VPN server 300. Further, the OS 40 changes the VPN adapter from a state indicating "disabled" to a state indicating "enabled".

The app 42 monitors a state of the adapter list 44. Thus, when the VPN adapter is added to the adapter list 44 in T112, the app 42 detects this change in T120. In this case, the app 42 sends a status request to the MFP 100 in T122. However, in the present case, when the VPN connection is established in T116, the OS 40 deletes the local IP address "192.168.0.0" of the MFP 100 from the routing table 46. In this case, the app 42 sends the status request including the IP address of the default gateway (such as the router 50) as the destination.

Even if the status request is sent to the default gateway, this status request will not be transferred to the MFP 100. As such, the terminal 10 does not receive status information from the MFP 100, which is a response to the status request. In a case where the status information from the MFP 100 is not received even when a predetermined time has elapsed since when the status request was sent, the app 42 determines that communication with the MFP 100 via the LAN 4 is inexecutable. Although details will be described later, the app 42 in this case executes a process for switching the default destination of the print instruction. In a situation where the terminal 10 cannot communicate with the MFP 100 via the LAN 4, the communication path for executing communication with the MFP 100 needs to be switched. As such, the app 42 can suitably cause the MFP 100 to execute print by switching the default destination of the print instruction (i.e., the communication path).

Further, at the stage of T122, the terminal 10 has not yet registered information indicating that the MFP 100 is registered in the SP server 400. That is, the terminal 10 does not store a communication path for sending the print instruction to the MFP 100 via the SP server 400 (i.e., via the Internet 6). In this case, the app 42 displays a notification screen SC1 on the display unit 14 in T130. The notification screen SC1 includes a message prompting the user to register the MFP 100 to the SP server 400. When the MFP 100 is registered in the SP server 400, the terminal 10 can then send the print instruction to the MFP 100 via the SP server 400. As such, the notification screen SC1 is a screen prompting the user to register, in the memory 34, the information for sending the print instruction to the MFP 100 via the SP server 400. The user can perform work to register the MFP 100 to the SP server 400 by seeing the notification screen SC1.

Continuation of FIG. 3; FIG. 4

When a registration operation by the user is accepted in T132 of FIG. 4, the app 42 sends a registration request to the SP server 400 in T134. The registration operation includes inputting a user ID, a password, and a device ID "AAA" identifying the MFP 100. The registration request includes the respective information (i.e., the user ID, the password, and the device ID "AAA") inputted in T132.

When the registration request is received from the terminal 10 in T134, the SP server 400 registers the received information in association with each other in T136. Then, when the registration is complete, the SP server 400 sends a registration completion notification to the terminal 10 in T138. The registration completion notification includes the registered information (i.e., the user ID, the password, and the device ID "AAA").

When the registration completion notification is received from the SP server 400 in T138, the app 42 registers the respective information included in the registration completion notification in the memory 34 in T140. As a result, the app 42 enters a state capable of sending signals such as the print instruction to the MFP 100 via the SP server 400. After this, in T142, the app 42 switches the default destination of the print instruction (i.e., the default print port) from the MFP 100 to the SP server 400.

In T150, the app 42 accepts a print operation by the user. As described above, at the stage of T150, the default destination of the print instruction is set to be the SP server 400. Due to this, the app 42 sends the print instruction to the SP server 400 in T152 provided the destination of the print instruction is not changed by the user. Specifically, the app 42 references the routing table 46 and sends the print instruction including the global IP address "153.246.0.0" of the SP server 400 as the destination. Especially, since the path information "192.168.0.1" (i.e., the IP address of the router 50) is associated with the IP address "153.246.0.0", the app 42 sends the print instruction to the SP server 400 via the router 50. The print instruction includes the device ID "AAA" registered in T140 and print data representing a print target image.

When the print instruction is received from the terminal 10 in T152, the SP server 400 sends in T153 the print instruction to the MFP 100 identified by the device ID "AAA" included in the received print instruction.

When the print instruction is received from the SP server 400 in T153, the MFP 100 executes print of the image according to the print data included in this print instruction in T154.

After this, when an operation for disconnecting the VPN connection is accepted in T160, the OS 40 disconnects the established VPN connection (see T116 of FIG. 3) in T162. As a result, the terminal 10 can no longer execute communication with the office server 200. Further, the OS 40 changes the VPN adapter from the state indicating "enabled" to the state indicating "disabled".

The app 42 monitors the state of the adapter list 44. Thus, when the VPN adapter is changed from the state indicating "enabled" to the state indicating "disabled" in T162, the app 42 detects this change in T163. In this case, the app 42 displays a notification screen SC2 on the display unit 14 in T164, and switches the default destination of the print instruction from the SP server 400 to the MFP 100 in T166. The notification screen SC2 includes a message indicating that the default destination of the print instruction is to be switched from the SP server 400 to the MFP 100. By seeing the notification screen SC2, the user can acknowledge that the default destination of the print instruction will be switched. After this, processes same as T100 to T104 of FIG. 3 are executed.

Continuation of FIG. 4; FIG. 5

Processes of T170 and T172 of FIG. 5 are same as the processes of T114 and T116 of FIG. 3. When the VPN adapter is changed from the state indicating "disabled" to the state indicating "enabled" in T172, the app 42 detects this change in T173. In this case, the app 42 sends the status request to the MFP 100 in T174. The process of T174 is same as the process of T122 of FIG. 3.

At the stage of T174, the terminal 10 has registered therein the information indicating that the MFP 100 is registered in the SP server 400 (see T140 of FIG. 4). That is, the terminal 10 stores the communication path for sending the print instruction to the MFP 100 via the SP server 400 (i.e., via the Internet 6). In this case, the app 42 displays a notification screen SC3 on the display unit 14 in T176, and switches the default destination of the print instruction from the MFP 100 to the SP server 400 in T178. The notification screen SC3 includes a message indicating that the default destination of the print instruction is to be switched from the MFP 100 to the SP server 400. By seeing the notification screen SC3, the user can acknowledge that the default destination of the print instruction will be switched. Processes of T180 to T184 are same as the processes of T150 to T154 of FIG. 4.

Figure 6:
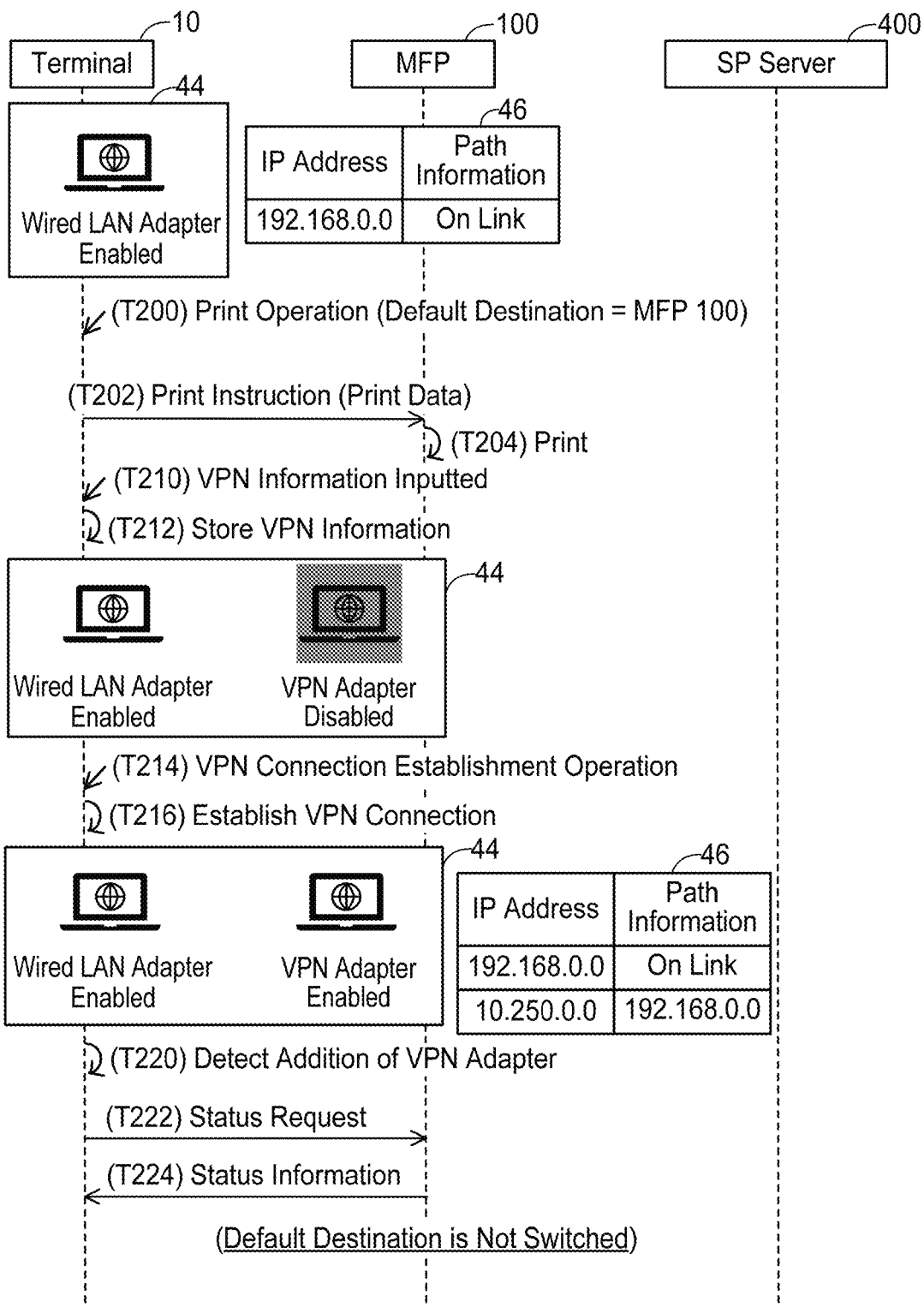
FIG. 6 shows a sequence diagram of Case B of the first embodiment.

Case B; FIG. 6

Next, Case B will be described with reference to FIG. 6. Case B differs from Case A in that the default destination remains unswitched even when the VPN connection is established. An initial state of FIG. 6 is same as the initial state of FIG. 3. Processes of T200 to T220 of FIG. 6 are same as the processes of T100 to T120 of FIG. 3.

In T222, the app 42 sends the status request to the MFP 100. In the present case, the OS 40 does not delete the IP address "192.168.0.0" of the MFP 100 from the routing table 46 even when the VPN connection is established in T216. As such, the app 42 sends the status request including this IP address "192.168.0.0" as the destination. Especially, since the path information "on link" is associated with the IP address "192.168.0.0", the app 42 directly sends the status request to the MFP 100 (i.e., without using the router 50 nor the Internet 6).

When the status request is received from the terminal 10 in T222, the MFP 100 sends the status information, which is the response to the status request, to the terminal 10 in T224. This status information includes a current status of the MFP 100 (such as being normal or in error).

When the status information is received from the MFP 100 in T224, the app 42 determines that communication with the MFP 100 via the LAN 4 is executable. In this case, the app 42 does not switch the default destination of the print instruction (i.e., maintains the default destination of the print instruction as the MFP 100). This is because in a situation where the terminal 10 can communicate with the MFP 100 via the LAN 4, the communication path for communicating with the MFP 100 does not need to be switched. Thus, the app 42 can be freed from executing unnecessary processes.

Figure 7:
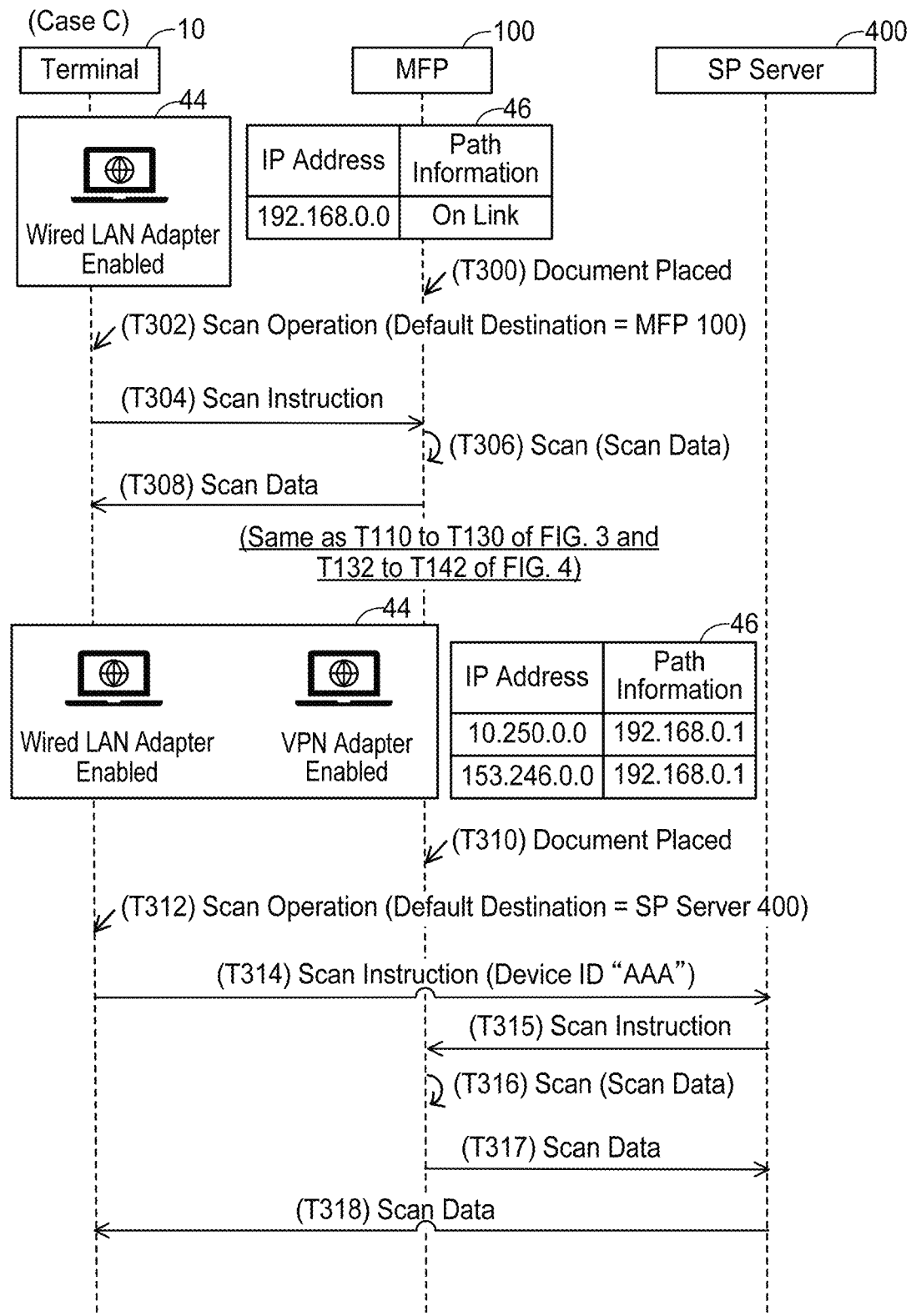
FIG. 7 shows a sequence diagram of Case C of the first embodiment.

Case C; FIG. 7

Next, Case C will be described with reference to FIG. 7. Case C differs from Case A in that the MFP 100 is caused to execute scan instead of print. An initial state of FIG. 7 is same as the initial state of FIG. 3.

In T300 of FIG. 7, the user of the MFP 100 places a document to be scanned on the scan executing unit 118.

In T302, the app 42 accepts a scan operation by the user. At the stage of T302, a default destination of a scan instruction (i.e., a default scan port) is set to be the MFP 100. In T302, the user does not change the destination of the scan instruction. Due to this, in T304, the app 42 references the routing table 46 and sends the scan instruction including the local IP address "192.168.0.0" of the MFP 100 as the destination. Especially, since the path information "on link" is associated with the IP address "192.168.0.0", the app 42 sends the scan instruction directly to the MFP 100 (i.e., without using the router 50 nor the Internet 6).

When the scan instruction is received from the terminal 10 in T304, the MFP 100 executes scan of the document placed on the scan executing unit 118 (see T300) and generates scan data. Then, in T308, the MFP 100 sends this generated scan data to the terminal 10. Due to this, the user can use the terminal 10 to check the scan data.

After this, processes same as the processes of T110 to T130 of FIG. 3 and T132 to T142 of FIG. 4 are executed. As a result, the default destination of the scan instruction is switched from the MFP 100 to the SP server 400. A process of T310 is same as the process of T300.

In T312, the app 42 accepts a scan operation by the user. As aforementioned, at the stage of T312, the default destination of the scan instruction is set to be the SP server 400. Due to this, the app 42 sends the scan instruction to the SP server 400 in T314 provided the destination of the scan instruction is not changed by the user. Specifically, the app 42 references the routing table 46 and sends the scan instruction including the global IP address "153.246.0.0" of the SP server 400 as the destination. Especially, since the path information "192.168.0.1" (i.e., the IP address of the router 50) is associated with the IP address "153.246.0.0", the app 42 sends the scan instruction to the SP server 400 via the router 50. The scan instruction includes the registered device ID "AAA" (see T140 of FIG. 4).

When the scan instruction is received from the terminal 10 in T314, the SP server 400 sends in T315 the scan instruction to the MFP 100 identified by the device ID "AAA" included in the received scan instruction.

When the scan instruction is received from the SP server 400 in T315, the MFP 100 executes scan of the document placed on the scan executing unit 118 (see T310) and generates scan data in T316. Then, in T317, the MFP 100 sends this generated scan data to the SP server 400.

When the scan data is received from the MFP 100 in T317, the SP server 400 sends this scan data to the terminal 10 in T318. Due to this, the user can use the terminal 10 to check the scan data.

Effects of First Embodiment

According to the above, the app 42 displays the notification screen SC1 (or SC3) on the display unit 14 (T130 of FIG. 3, T176 of FIG. 5) in the case of detecting the addition of the VPN adapter (T120 of FIG. 3) or in the case of changing the VPN adapter from the state indicating "disabled" to the state indicating "enabled" (T173 of FIG. 5). As a result, the default destination of the print instruction is switched from the MFP 100 to the SP server 400 (T142 of FIG. 4, T178 of FIG. 5). As above, the app 42 can switch the default destination of the print instruction according to the detection of the addition of the VPN adapter or the detection of the change in the VPN adapter from the state indicating "disabled" to the state indicating "enabled". As such, the app 42 can cause the MFP 100 to execute print using the communication path via the Internet 6 (i.e., via the SP server 400) in the communication environment in which there is a possibility that communication via the Internet 6 may be executed, especially in the communication environment in which there is a possibility that the VPN may be used.

Corresponding Relationship

The terminal 10 and the MFP 100 are respectively an example of "terminal device" and "function executing device". The print function and the scan function are examples of "specific function". The print operation in T100 and the print instruction in T102 of FIG. 3 are respectively an example of "function executing operation" and "function executing instruction". The communication path for sending the print instruction (and the scan instruction) to the MFP 100 is an example of "target communication path". The communication path using only the LAN 4 and the communication path via the SP server 400 are respectively an example of "first communication path" and "second communication path". The VPN adapter is an example of "VPN communication information" and "specific adapter". In one aspect, the addition of the VPN adapter to the adapter list 44 is an example of "predetermined condition" being satisfied. In another aspect, the VPN adapter being changed from the state indicating "disabled" to the state indicating "enabled" is an example of the "predetermined condition" being satisfied. The notification screen SC2, the notification screen SC1, and the notification screen SC3 are respectively an example of "first notification screen", "second notification screen", and "third notification screen". The process of T130 of FIG. 3 is an example of "specific process". The respective pieces of information registered in T140 of FIG. 4 (i.e., the user ID, the password, and the device ID "AAA") are examples of "setting information".

The process of T102 of FIG. 3 is an example of "send, by using a target communication path, a function executing instruction". The process of T122 is an example of "determine whether communication with the function executing device by using the first communication path is executable". The process of T130, the processes of T132 to T142 of FIG. 4, and the process of T176 and the process of T178 of FIG. 5 are examples of "execute a related process". The process of T164 of FIG. 4 is an example of "cause a display unit of the terminal device to display a first notification screen".

Figure 8:
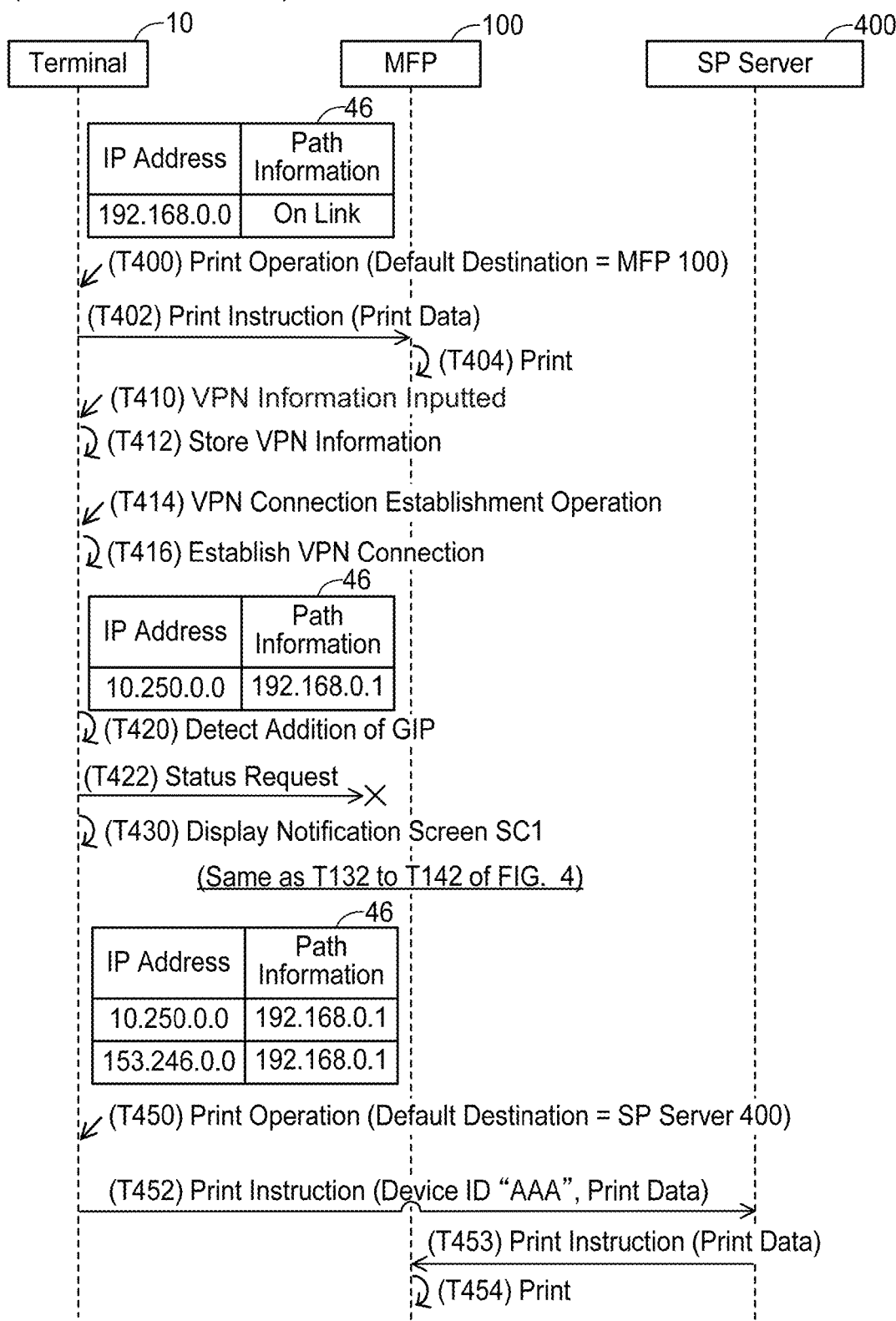
FIG. 8 shows a sequence diagram of a second embodiment.

Second Embodiment; FIG. 8

Next, a second embodiment will be described with reference to FIG. 8. The second embodiment is different from the first embodiment in that a global IP address is added to the routing table 46. In the second embodiment, the adapter list 44 is not used. An initial state of FIG. 8 is same as the initial state of FIG. 3 except that the adapter list 44 is not used.

Processes of T400 to T416 of FIG. 8 are same as the processes of T100 to T116 of FIG. 3. The app 42 monitors the state of the routing table 46. In the present case, when the VPN connection is established in T416, the OS 40 deletes the local IP address "192.168.0.0" of the MFP 100 from the routing table 46 and adds the global IP address "10.250.0.0" of the VPN server 300 to the routing table 46. When the global IP address "10.250.0.0" of the VPN server 300 is added to the routing table 46, the app 42 detects this addition in T420. In this case, in T422, the app 42 sends the status request to the MFP 100. A process of T422 is same as the process of T122.

A process of T430 is same as the process of T130 of FIG. 3. After this, processes same as T132 to T142 of FIG. 4 are executed. As a result, the default destination of the print instruction is switched from the MFP 100 to the SP server 400. Processes of T450 to T454 are same as the processes of T150 to T154.

Effects of Second Embodiment

According to the above, the app 42 displays the notification screen SC1 on the display unit 14 (T430 of FIG. 8) in the case of detecting the addition of the global IP address to the routing table 46 (T420 of FIG. 8). As a result, the default destination of the print instruction is switched from the MFP 100 to the SP server 400 (T142 of FIG. 4 incorporated in FIG. 8). As above, the app 42 can switch the default destination of the print instruction according to the detection of the addition of the global IP address. As such, the app 42 can cause the MFP 100 to execute print using the communication path via the Internet 6 (i.e., via the SP server 400) in the communication environment in which there is a possibility that communication using the global IP address may be executed. The addition of the global IP address to the routing table 46 is an example of the "predetermined condition" being satisfied. The global IP address "10.250.0.0" of the VPN server 300 is an example of the "VPN communication information".

Third Embodiment

Next, a third embodiment will be described with reference to FIG. 9. The third embodiment is different from the second embodiment in that the routing table 46 further stores a metric in association with the IP address and the path information. A metric is information indicating priority of communication having the associated IP address as its communication destination. In the present embodiment, a smaller metric value indicates higher priority.

Case D-1; FIG. 9

Firstly, Case D-1 in which the default destination of the print instruction remains unswitched will be described with reference to FIG. 9. In an initial state of Case D-1, the routing table 46 stores the local IP address "192.168.0.0" of the MFP 100 and the global IP address "153.246.0.0" of the SP server 400. That is, in the initial state of Case D-1, the terminal 10 has already executed the process of T140 of FIG. 4.

In Case D-1, firstly, processes that are same as T400 to T420 of FIG. 8 are executed. However, in the present case, the OS 40 does not delete the local IP address "192.168.0.0" of the MFP 100 from the routing table 46 even after the VPN connection is established (see Case B of the first embodiment in FIG. 6). In this case, the app 42 compares a metric value "100" associated with the local IP address "192.168.0.0" of the MFP 100 and a metric value "4000" associated with the global IP address "153.246.0.0" of the SP server 400. In the present case, the app 42 determines in T510 of FIG. 9 that the former is smaller than the latter. That is, the app 42 determines that priority of communication with the MFP 100 using the communication path that only uses the LAN 4 is higher. In this case, the app 42 does not switch the default destination of the print instruction. This is because in such a situation, the app 42 highly likely does not need to switch the communication path for executing communication with the MFP 100. As such, the app 42 is freed from executing processes of which execution is highly likely unnecessary.

Case D-2; FIG. 9

Next, Case D-2 in which the default destination is switched will be described with reference to FIG. 9. An initial state of Case D-2 is same as the initial state of Case D-1.

In Case D-2 as well, firstly, processes that are same as T400 to T420 of FIG. 8 are executed. However, in the present case, the OS 40 does not delete the local IP address "192.168.0.0" of the MFP 100 from the routing table 46 even after the VPN connection is established (see Case B of the first embodiment in FIG. 6). In this case, the app 42 compares the metric value "4000" associated with the local IP address "192.168.0.0" of the MFP 100 and the metric value "100" associated with the global IP address "153.246.0.0" of the SP server 400. In the present case, the app 42 determines in T520 of FIG. 9 that the latter is smaller than the former. That is, the app 42 determines that priority of communication with the MFP 100 using the communication path via the SP server 400 (i.e., via the Internet 6) is higher.

In this case, the app 42 displays the notification screen SC3 in T522 and switches the default destination from the MFP 100 to the SP server 400 in T524. In such a situation, the app 42 is highly likely incapable of executing communication with the MFP 100 using only the LAN 4. That is, the communication path for executing communication with the MFP 100 highly likely needs to be switched. As such, the app 42 can suitably cause the MFP 100 to execute print by switching the default destination of the print instruction. The metric is an example of "priority information". The process of T510 and the process of T520 are examples of "determine which is higher, a priority of communication with the function executing device using the first communication path or a priority of communication with the function executing device using the second communication path".

(Variant 1) The app 42 may determine whether the VPN adapter is already stored in the adapter list 44 in a case where the app 42 is activated in the situation where the default destination of the print instruction is the MFP 100. In this case, in a case of determining that the VPN adapter is stored, the app 42 may switch the default destination of the print instruction to the SP server 400 (see T142 of FIG. 4) regardless of the stored VPN adapter being in the enabled state or the disabled state. In the present variant, having the VPN adapter already stored is an example of the "predetermined condition" being satisfied.

(Variant 2) The app 42 may execute the processes of T164 and T166 of FIG. 4 in a case of detecting deletion of the VPN adapter from the adapter list 44 in the situation where the default destination of the print instruction is the SP server 400. In the present variant, deletion of the VPN adapter is an example of "a state of the specific adapter is changed from an enabled state to a disabled state". Further, in another variant, the app 42 may not switch the default destination of the print instruction even when the VPN adapter is changed from the state indicating "enabled" to the state indicating "disabled" (see T163) in the situation where the default destination is the SP server 400. In the present variant, the processes of T164 and T166 may be omitted. In the present variant, "cause a display unit of the terminal device to display a first notification screen" may be omitted.

(Variant 3) In T176 of FIG. 5, the app 42 may display an inquiry screen for inquiring the user whether to switch the default destination of the print instruction instead of the notification screen SC3. In this case, the app 42 may execute the process of T178 in a case of accepting an operation by the user instructing to switch the default destination of the print instruction on the inquiry screen. In general terms, the "related process" may not include displaying the third notification screen indicating that the target communication path is to be switched from the first communication path to the second communication path on the display unit of the terminal device.

(Variant 4) The app 42 may not send the status request (see T122) to the MFP 100 in the case of detecting the addition of the VPN adapter in T120 of FIG. 3. In this case, for example, the app 42 may send the print instruction to the MFP 100 (see T100 and T102) in a case of accepting the print operation by the user after the addition of the VPN adapter has been detected, and may display the notification screen SC1 (see T130) in a case of not receiving a notification indicating that print has been completed from the MFP 100 even after a predetermined time has elapsed since when the aforementioned print instruction was sent. In the present variant, determining whether the notification indicating that the print has been completed has been received is an example of "determine whether communication with the function executing device by using the first communication path is executable". In general terms, the method of determining whether the communication with the function executing device using the first communication path is executable in this "determine whether communication with the function executing device by using the first communication path is executable" is not limited to the configuration described in the above embodiments.

(Variant 5) The "specific function" is not limited to the print function and the scan function as in the embodiments above, and may for example be a FAX function.

(Variant 6) The processes of FIGS. 3 to 9 are realized by software (e.g., the OS 40 and the app 42) in the embodiments as above, however, at least one of these processes may be realized by hardware such as a logic circuit.

What is claimed is:

1. A non-transitory computer-readable recording medium storing computer-readable instructions for a terminal device, wherein the computer-readable instructions, when executed by a processor of the terminal device, cause the terminal device to:

in a case where a function executing operation for causing a function executing device to execute a specific function is accepted, send, by using a target communication path, a function executing instruction for causing the function executing device to execute the specific function to the function executing device wherein in a situation where the terminal device and the function executing device are connected to a same specific local area network and a memory of the terminal device does not store Virtual Private Network (VPN) communication information for using a VPN, in a case where a first function executing operation is accepted, a first function executing instruction is sent to the function executing device by using a first communication path as the target communication path, and the first communication path is a communication path for communicating with the function executing device via a local area network without using the Internet; and after the first function executing instruction has been sent to the function executing device by using the first communication path, in a case where the terminal device and the function executing device are connected to the same specific local area network and the memory of the terminal device stores the VPN communication information, execute a related process which is related to switching the target communication path from the first communication path to a second communication path, wherein the second communication path is a communication path for communicating with the function executing device via the Internet, wherein after the target communication path has been switched from the first communication path to the second communication path in response to the related process being executed, in a case where the terminal device and the function executing device are connected to the same specific local area network and a second function executing operation is accepted, a second function executing instruction is sent to the function executing device by using the second communication path as the target communication path, wherein the function executing device to which the second function executing instruction is sent is the same as the function executing device to which the first function executing instruction was sent, wherein the function executing device comprises at least one of a print executing unit and, a scan executing unit, and a facsimile executing unit, and wherein the specific function is at least one of a print function, a scan function, and a facsimile function.

2. The non-transitory computer-readable recording medium as in claim 1, wherein the memory further stores a routing table, the memory of the terminal device storing the VPN communication information includes a global IP address of a VPN server being added to the routing table in the memory, and the routing table is a table for storing information which is used by an Operating System (OS) program when the OS program determines a communication path for executing communication with another device.

3. The non-transitory computer-readable recording medium as in claim 1, wherein the memory further stores one or more network adapters, the memory of the terminal device storing the VPN communication information includes a specific adapter of the one or more network adapters being stored in the memory of the terminal device.

4. The non-transitory computer-readable recording medium as in claim 3, wherein the computer-readable instructions, when executed by the processor, further cause the terminal device to:

in a case where a state of the specific adapter is changed from an enabled state to a disabled state after the target communication path has been switched from the first communication path to the second communication path, cause a display unit of the terminal device to display a first notification screen which indicates that the target communication path is to be switched from the second communication path to the first communication path.

5. The non-transitory computer-readable recording medium as in claim 1, wherein the related process includes a specific process for registering setting information in the memory, the setting information being information for sending the function executing instruction by using the second communication path.

6. The non-transitory computer-readable recording medium as in claim 5, wherein the specific process includes displaying a second notification screen on a display unit of the terminal device, the second notification screen being a screen which prompts a user to register the setting information in the memory.

7. The non-transitory computer-readable recording medium as in claim 1, wherein the related process includes displaying a third notification screen on a display unit of the terminal device, the third notification screen being a screen indicating that the target communication path is to be switched from the first communication path to the second communication path.

8. The non-transitory computer-readable recording medium as in claim 1, wherein the computer-readable instructions, when executed by the processor, further cause the terminal device to:

determine whether communication with the function executing device by using the first communication path is executable, wherein after the first function executing instruction has been sent to the function executing device by using the first communication path, in a case where: the terminal device and the function executing device are connected to the same specific local area network, the memory of the terminal device stores the VPN communication information and the communication with the function executing device by using the first communication path is determined as inexecutable, the related process is executed.

9. The non-transitory computer-readable recording medium as in claim 1, wherein the memory stores a routing table for describing an IP address and priority information in association with each other, the priority information indicating a priority of communication with the IP address as a communication destination, and the routing table is a table for storing information which is used by an Operating System (OS) program when the OS program determines a communication path for executing communication with another device, wherein the computer-readable instructions, when executed by the processor, further cause the terminal device to:

determine which is higher, a priority of communication with the function executing device using the first communication path or a priority of communication with the function executing device using the second communication path, wherein after the first function executing instruction has been sent to the function executing device by using the first communication path, in a case where: the terminal device and the function executing device are connected to the same specific local area network, the memory of the terminal device stores the VPN communication information and the priority of the communication with the function executing device using the second communication path is determined as being higher, the related process is executed.

10. A non-transitory computer-readable recording medium storing computer-readable instructions for a terminal device, the terminal device comprising a memory configured to store one or more network adapters, wherein the computer-readable instructions, when executed by a processor of the terminal device, cause the terminal device to:

in a case where a function executing operation for causing a function executing device to execute a specific function is accepted, send, by using a target communication path, a function executing instruction for causing the function executing device to execute the specific function to the function executing device, wherein in a situation where the terminal device and the function executing device are connected to a same specific local area network and the one or more network adapters in the memory of the terminal device do not include a specific adapter indicating a communication via the Internet, in a case where a first function executing operation is accepted, a first function executing instruction is sent to the function executing device by using a first communication path as the target communication path, and the first communication path is a communication path for communicating with the function executing device via a local area network without using the Internet; and after the first function executing instruction has been sent to the function executing device by using the first communication path, in a case where the terminal device and the function executing device are connected to the same specific local area network and the one or more network adapters in the memory of the terminal device include the specific adapter, execute a related process related to switching the target communication path from the first communication path to a second communication path, wherein the second communication path is a communication path for communicating with the function executing device via the Internet, wherein after the target communication path has been switched from the first communication path to the second communication path in response to the related process being executed, in a case where the terminal device and the function executing device are connected to the same specific local area network and a second function executing operation is accepted, a second function executing instruction is sent to the function executing device by using the second communication path as the target communication path, wherein the function executing device to which the second function executing instruction is sent is the same as the function executing device to which the first function executing instruction was sent, wherein the function executing device comprises at least one of a print executing unit and, a scan executing unit, and a facsimile executing unit, and wherein the specific function is at least one of a print function, a scan function, and a facsimile function.

11. The non-transitory computer-readable recording medium as in claim 10, wherein the computer-readable instructions, when executed by the processor, further cause the terminal device to:

in a case where a state of the specific adapter is changed from an enabled state to a disabled state after the target communication path has been switched from the first communication path to the second communication path, cause a display unit of the terminal device to display a first notification screen which indicates that the target communication path is to be switched from the second communication path to the first communication path.

12. The non-transitory computer-readable recording medium as in claim 10, wherein the related process includes a specific process for registering setting information in the memory, the setting information being information for sending the function executing instruction by using the second communication path.

13. The non-transitory computer-readable recording medium as in claim 12, wherein the specific process includes displaying a second notification screen on a display unit of the terminal device, the second notification screen being a screen which prompts a user to register the setting information in the memory.

14. The non-transitory computer-readable recording medium as in claim 13, wherein the related process includes displaying a third notification screen on a display unit of the terminal device, the third notification screen being a screen indicating that the target communication path is to be switched from the first communication path to the second communication path.

15. The non-transitory computer-readable recording medium as in claim 10, wherein the computer-readable instructions, when executed by the processor, further cause the terminal device to:

determine whether communication with the function executing device by using the first communication path is executable, wherein after the first function executing instruction has been sent to the function executing device by using the first communication path, in a case where: the terminal device and the function executing device are connected to the same specific local area network, the one or more network adapters in the memory of the terminal device include the specific adapter and the communication with the function executing device by using the first communication path is determined as inexecutable, the related process is executed.

16. The non-transitory computer-readable recording medium as in claim 10, wherein the memory stores a routing table for describing an IP address and priority information in association with each other, the priority information indicating a priority of communication with the IP address as a communication destination, and the routing table is a table for storing information which is used by an Operating System (OS) program when the OS program determines a communication path for executing communication with another device, wherein the computer-readable instructions, when executed by the processor, further cause the terminal device to:

determine which is higher, a priority of communication with the function executing device using the first communication path or a priority of communication with the function executing device using the second communication path, wherein after the first function executing instruction has been sent to the function executing device by using the first communication path, in a case where: the terminal device and the function executing device are connected to the same specific local area network, the one or more network adapters in the memory of the terminal device include the specific adapter and the priority of the communication with the function executing device using the second communication path is determined as being higher, the related process is executed.

17. A non-transitory computer-readable recording medium storing computer-readable instructions for a terminal device, the terminal device comprising a memory configured to store a routing table, wherein the computer-readable instructions, when executed by a processor of the terminal device, cause the terminal device to:

in a case where a function executing operation for causing a function executing device to execute a specific function is accepted, send, by using a target communication path, a function executing instruction for causing the function executing device to execute the specific function to the function executing device, wherein in a situation where the terminal device and the function executing device are connected to a same specific local area network and a global IP address is not added to the routing table in the memory of the terminal device, in a case where a first function executing operation is accepted, a first function executing instruction is sent to the function executing device by using a first communication path as the target communication path, the first communication path is a communication path for communicating with the function executing device via a local area network without using the Internet, and the routing table is a table for storing information which is used by an Operating System (OS) program when the OS program determines a communication path for executing communication with another device; and after the first function executing instruction has been sent to the function executing device by using the first communication path, in a case where the terminal device and the function executing device are connected to the same specific local area network and the global IP address is added to the routing table in the memory of the terminal device, execute a related process related to switching the target communication path from the first communication path to a second communication path, wherein the second communication path is a communication path for communicating with the function executing device via the Internet, wherein after the target communication path has been switched from the first communication path to the second communication path in response to the related process being executed, in a case where the terminal device and the function executing device are connected to the same specific local area network and a second function executing operation is accepted, a second function executing instruction is sent to the function executing device by using the second communication path as the target communication path, wherein the function executing device to which the second function executing instruction is sent is the same as the function executing device to which the first function executing instruction was sent, wherein the function executing device comprises at least one of a print executing unit and, a scan executing unit, and a facsimile executing unit, and wherein the specific function is at least one of a print function, a scan function, and a facsimile function.

18. The non-transitory computer-readable recording medium as in claim 17, wherein the related process includes a specific process for registering setting information in the memory, the setting information being information for sending the function executing instruction by using the second communication path.

19. The non-transitory computer-readable recording medium as in claim 18, wherein the specific process includes displaying a second notification screen on a display unit of the terminal device, the second notification screen being a screen which prompts a user to register the setting information in the memory.

20. The non-transitory computer-readable recording medium as in claim 17, wherein the related process includes displaying a third notification screen on a display unit of the terminal device, the third notification screen being a screen indicating that the target communication path is to be switched from the first communication path to the second communication path.

21. The non-transitory computer-readable recording medium as in claim 17, wherein the computer-readable instructions, when executed by the processor, further cause the terminal device to:

determine whether communication with the function executing device by using the first communication path is executable, wherein after the first function executing instruction has been sent to the function executing device by using the first communication path, in a case where: the terminal device and the function executing device are connected to the same specific local area network, the global IP address is added to the routing table in the memory of the terminal device and the communication with the function executing device by using the first communication path is determined as inexecutable, the related process is executed.

22. The non-transitory computer-readable recording medium as in claim 17, wherein the memory stores a routing table for describing an IP address and priority information in association with each other, the priority information indicating a priority of communication with the IP address as a communication destination, and the routing table is a table for storing information which is used by an Operating System (OS) program when the OS program determines a communication path for executing communication with another device, wherein the computer-readable instructions, when executed by the processor, further cause the terminal device to:

determine which is higher, a priority of communication with the function executing device using the first communication path or a priority of communication with the function executing device using the second communication path, wherein after the first function executing instruction has been sent to the function executing device by using the first communication path, in a case where: the terminal device and the function executing device are connected to the same specific local area network, the global IP address is added to the routing table in the memory of the terminal device and the priority of the communication with the function executing device using the second communication path is determined as being higher, the related process is executed.

* * * * *